Oct. 31, 1939.  A. PERSON  2,177,994
VENTILATOR
Filed Aug. 9, 1937   3 Sheets-Sheet 2
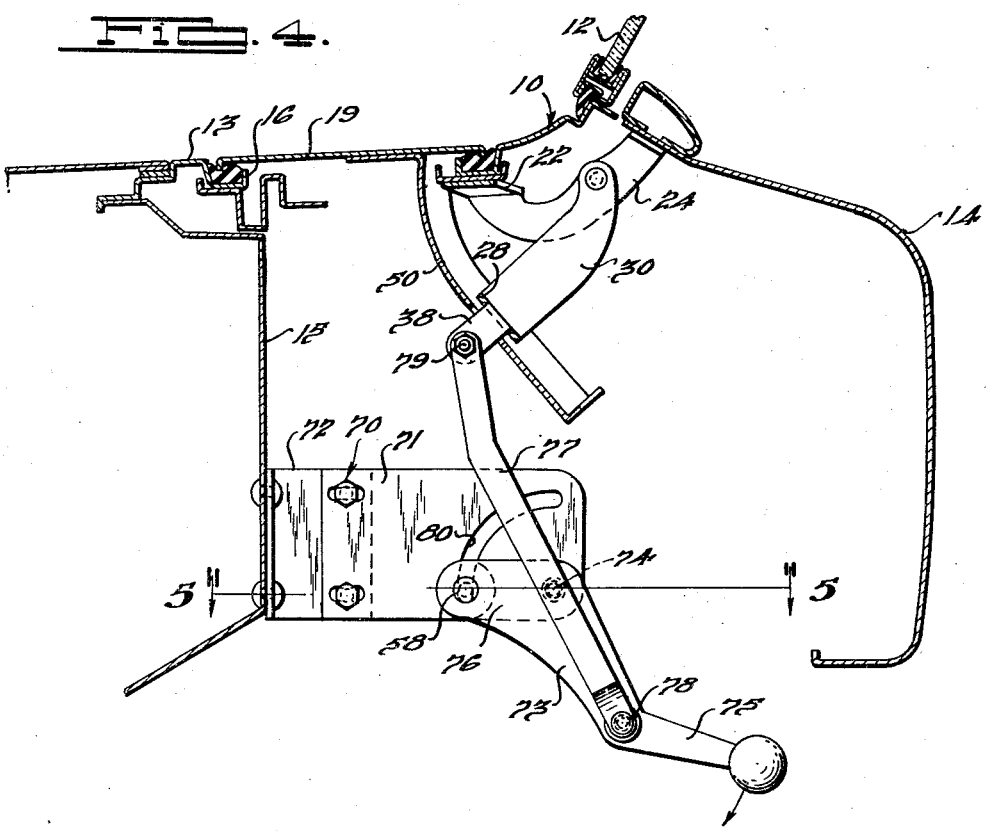
INVENTOR
Alfred Person.
BY Harness, Dickey & Pierce.
ATTORNEYS.

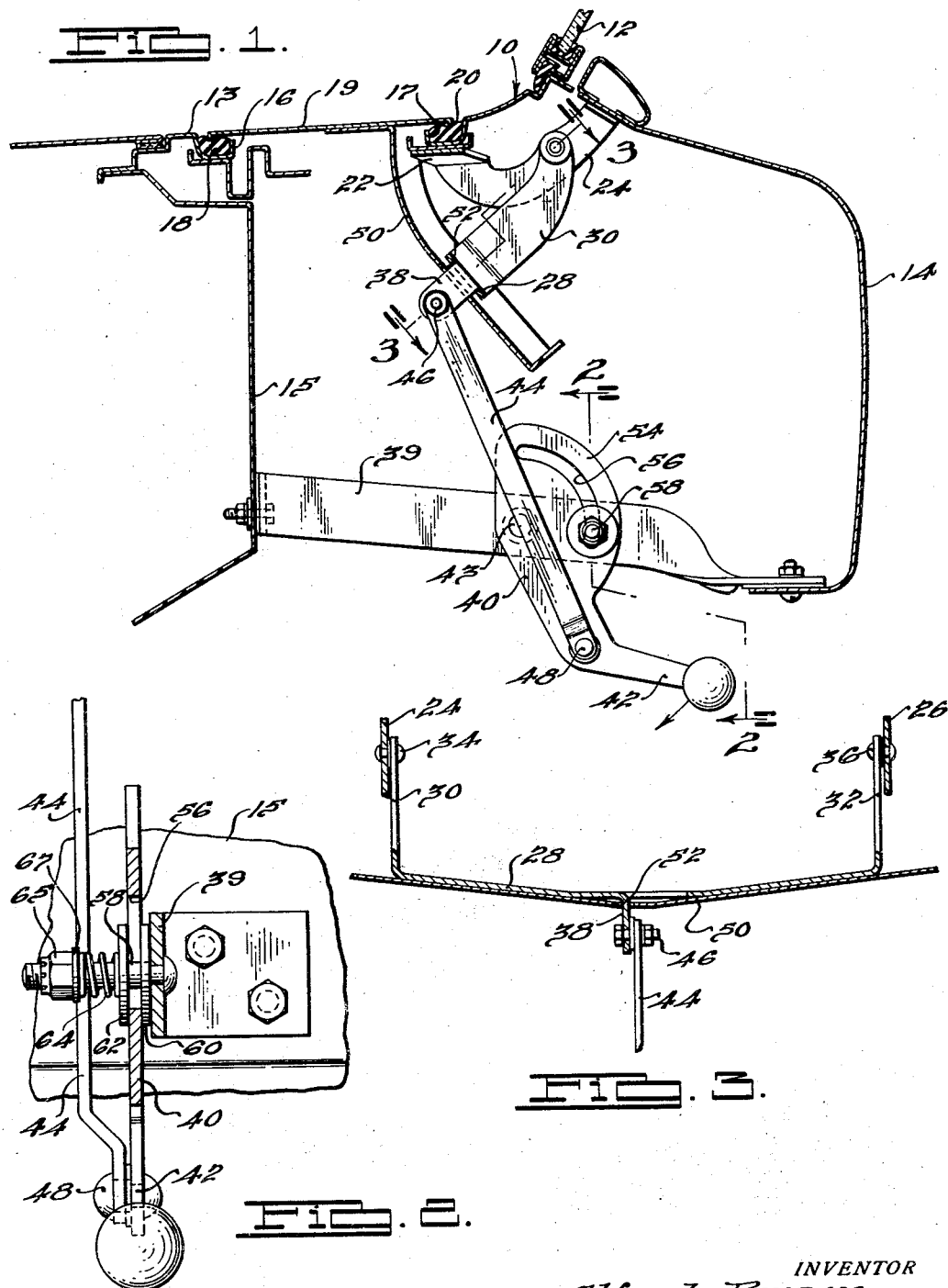

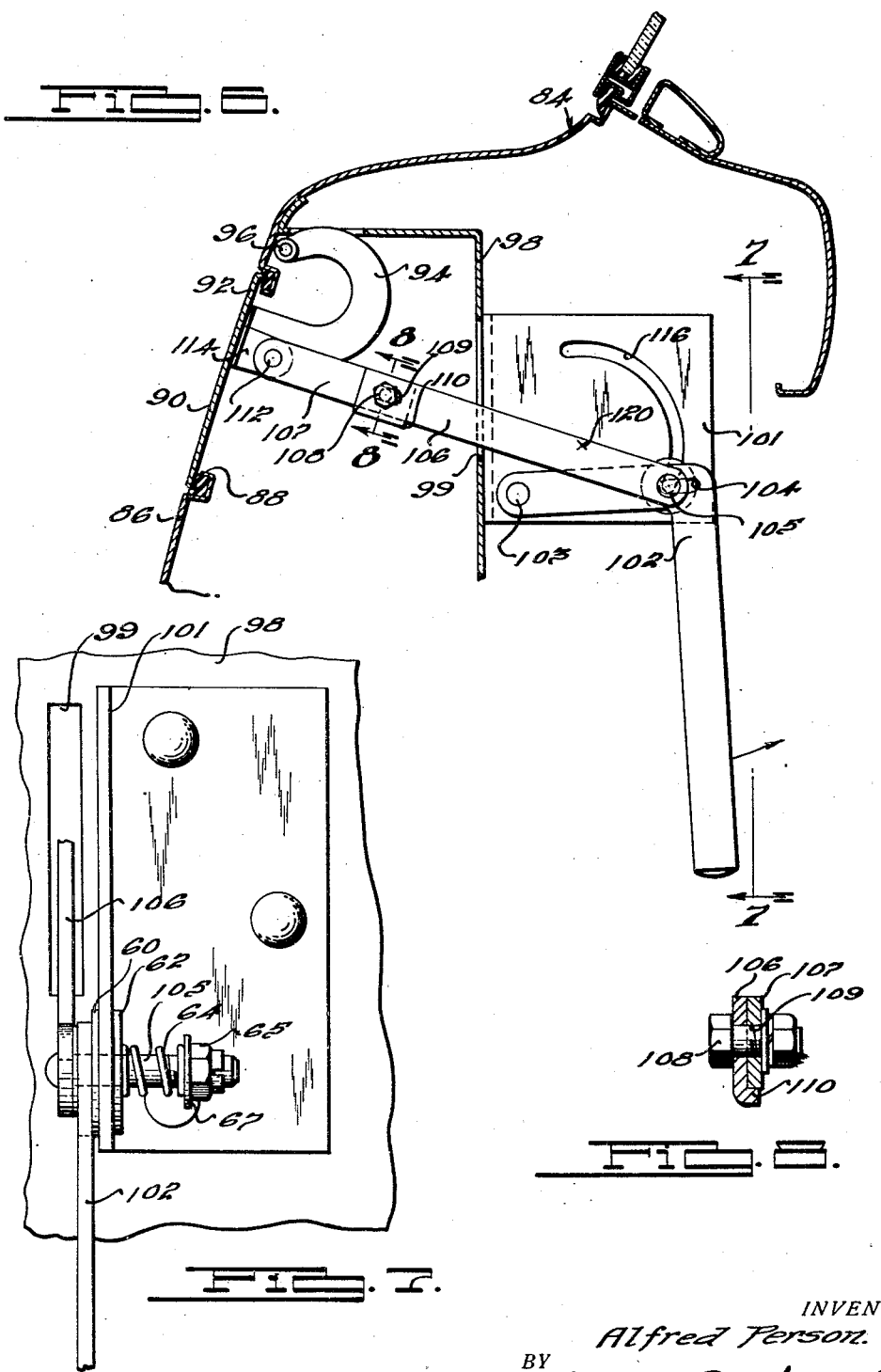

Patented Oct. 31, 1939

2,177,994

UNITED STATES PATENT OFFICE 2,177,994

VENTILATOR

Alfred Person, Detroit, Mich., assignor to The Murray Corporation of America, Detroit, Mich., a corporation of Delaware Application August 9, 1937, Serial No. 158,030

2 Claims. (Cl. 98—2)

This invention relates to vehicle ventilators and particularly relates to a vehicle ventilator operating structure.

One of the objects of the present invention is to provide an operating structure for a vehicle ventilator by which a ventilating shutter is locked in its closed position and cannot be forced open by a force applied to the exterior of the shutter, to thereby prevent one from gaining access to the interior of the vehicle through the ventilator opening.

Another object of the present invention is to provide a ventilating operating structure associated with a shutter member of such a construction that the shutter member is locked in its closed position and any force applied to the exterior of the shutter member tends to further lock the operating structure against opening of the shutter member.

Another object of the present invention is to provide a locking structure for the shutter of a vehicle ventilator so that the ventilator is locked in its closed position, in combination with a resilient means by which the ventilator may be resiliently held in any one of its open positions.

Another object of the present invention is to provide an operating mechanism for the shutter of a vehicle ventilating structure which is positive in its operation to lock the shutter member in its closed position.

A further object of the present invention is to provide an operating structure for the shutter of a vehicle ventilator which is simple and economical to construct.

Other objects of the invention will become apparent from the following specification, the drawings relating thereto, and from the claims hereinafter set forth.

In the drawings in which like numerals are used to designate like parts in the several views throughout:

Figure 1 is a fragmentary vertical cross sectional view, illustrating parts in elevation, and parts in perspective, of a structure embodying features of the present invention;

Fig. 2 is a partial elevational view and a partial cross sectional view taken substantially along the line 2—2 of Fig. 1;

Fig. 3 is a partial cross sectional view and partial elevational view taken substantially along the line 3—3 of Fig. 1;

Fig. 4 is a view similar to Fig. 1 illustrating a modified embodiment of the present invention;

Fig. 5 is a partial cross sectional view and partial plan view, taken substantially along the line 5—5 of Fig. 4;

Fig. 6 is a view similar to Fig. 1 illustrating another modified embodiment of the present invention;

Fig. 7 is an elevational view taken substantially along the line 7—7 of Fig. 6; and, Fig. 8 is a cross sectional view, with parts in elevation, taken substantially along the line 8—8 of Fig. 6.

Referring to the drawings and referring particularly to Figs. 1 to 3, an automobile is generally indicated at 10 having a windshield 12, a cowl 13, an instrument panel 14, and a dashboard 15. The cowl 13 is provided with a conventional ventilator opening 16 therethrough defined by an upwardly opening channel 17 within which sealing strips 18 of a material such as sponge rubber are fixed.

A cowl ventilator shutter member 19 is mounted over the opening 16 and has downwardly directed peripheral flanges 20 which are adapted to bear against the resilient strips 18 when the shutter member 19 is in its closed position for sealing the opening.

In order to move the shutter member 19 to opened and closed positions, and to lock the shutter member 19 against opening while in its closed position, according to the present invention an operating structure is provided which is mounted within the interior of the automobile. A first supporting member 22 having side arms 24 and 26 is mounted within the automobile and suitably secured to the under surface of the cowl 13 adjacent the rear of the cowl opening. The rearwardly extending ends of the side arms 24 and 26 may be suitably secured to the upper edge of the instrument panel 14. A substantially U-shaped linkage member 28 having rearwardly directed side arms 30 and 32 is provided with the free ends of the arms 30 and 32 pivotally connected by pins 34 and 36 to side arms 24 and 26, respectively. The base portion of the linkage member 28 extends transversely of the vehicle and has a forwardly struck-out projection 38 substantially at its center.

A second elongated supporting member 39 is mounted within the automobile longitudinally thereof and has its forward end suitably secured to the dashboard 15 and its rear end suitably secured to the lower edge of the instrument panel 14. Another linkage member 40 having a rearwardly extending handle operating portion 42, is pivotally mounted to the supporting members 39 by a pivot pin 43. A third elongated linkage member 44 is pivotally connected by a pivot pin 46 to the projecting portion 38 of the linkage member 28, and is pivotally connected to the linkage member 40 intermediate its length by a pivot pin 48.

The linkage members 28, 40, and 44 provide a toggle linkage mechanism for operating the shutter member 19; and is operatively connected to the shutter member 19 by means of an operating plate member 50. The member 50 is suitably secured at its upper edge to the under surface of the shutter member 19 and extends downwardly and rearwardly within the automobile. The member 50 is provided with an elongated slot 52 therethrough through which the projection 38 of the linkage member 28 extends. Upon pivotal movement of the linkage member 28 the projection 38 engages the member 50 and raises or lowers the member 50 to open and close the shutter member 19.

The linkage members forming the toggle mechanism are so constructed and arranged that the line between the pivotal connections of the linkage member 44 with the linkage members 28 and 40 passes over the center of the pivot pin 43 when the shutter member 19 is opened and closed so that the shutter member is locked in its closed position. Referring to Fig. 1 in which the shutter member 19 is illustrated in its closed position, the linkage member 44 is straight and the center line of the linkage member 44 is inside the center of the pivot pin 43 when the shutter member is closed. It is evident that any attempt to open the shutter member 19 by the application of a tool to the exterior of the shutter member along one of its edges would tend to rotate the linkage member 40 counter-clockwise.

In order to limit the movement of the linkage member 40, the member 40 is provided with a curved plate-like portion 54 having a curved slot 56 therethrough which is in the form of a segment of a circle about the pivot pin 43. An elongated guide bolt 58 is suitably secured to the supporting members 39 and extend through the elongated slot 56 so that the ends of the slot 56 abut against the bolt 58 and limit the movement of the linkage member 40. When the shutter member 19 is in its closed position, the lower end of the slot 56 abuts against the bolt 58 and any attempt to apply a force to the exterior of the shutter member 19, as explained above, would tend merely to rotate the linkage member 40 in a counter-clockwise direction, which movement would be prevented by the bolt 58.

In order to resiliently hold the shutter member 19 in any one of its adjusted open positions, washers 60 and 62 are mounted over the bolt 58 in frictional engagement with the opposite sides of the plate-like portion 54 of the linkage member 40. The washers are frictionally held against the plate-like portion 54 by means of a spiral spring 64 which is mounted over the bolt 58 and held in abutment against the washer 62 by means of an adjustable nut 65 and washer 67 threadably received over the end of the bolt 58. The pressure applied by the spring 64 may be suitably adjusted by adjusting the position of the nut 65 on the bolt 58. The washers 60 and 62 are fixed in relation to the supporting member 39 and by their frictional engagement with the plate-like portion 54 of the linkage member 40, the shutter member 19 would be held in any one of its adjusted positions along the slot 56.

A modified embodiment of the present invention is illustrated in Figs. 4 and 5 which operates to lock the shutter member 19 in closed position and resiliently hold the shutter member in an adjusted open position in the same manner as the embodiment described above, but in which a guide slot, similar to the guide slot 56, is provided in a supporting member rather than in one of the linkage members. Referring to Figs. 4 and 5, a bracket member 70 having a plate portion 71 and an angle portion 72 is mounted within the automobile and suitably secured to the inner face of the dashboard 15 with the plate portion 71 extending rearwardly of the vehicle. A linkage member 73, corresponding to the linkage member 40 previously described, is pivotally mounted to the plate portion 71 by means of a pivot pin 74. The linkage member 73 has an operating handle portion 75 and a forwardly extending portion 76. A bent linkage member 77, corresponding to the linkage member 44 previously described, is pivotally connected by a pivot pin 78 to the linkage member 73, and is pivotally connected by a pivot pin 79 to the projection 38 on the linkage member 28. The linkage member 77 is bent and is of such a construction that a line between the pivot pin 79 and the pivot pin 78 lies to the right of the center of the pivot pin 76 (as viewed in Fig. 4) when the shutter 19 is in its closed position.

An elongated curved slot 80, corresponding to the slot 56 previously described, is provided in the plate member 71 about the pivot pin 74 in order to provide a guide and limiting slot for the linkage member 73. In the embodiment illustrated in Figs. 4 and 5, the bolt 58 is secured to the forwardly extending portion 76 of the linkage member 73 and extends through the slot 80 for movement therealong. The spiral spring 64 with the nut 65 and the engaging washers 60 and 62 resiliently and frictionally hold the linkage member 73 in an adjusted position along the length of the slot 80 so that the shutter member 19 is held in an adjusted open position.

The link 73 is limited in its counter-clockwise movement, as viewed in Fig. 4, by abutment of the pin 58 against the lower end of the slot 80; and with the line between the centers of the pivot pins 78 and 79 lying to the right of the center of the pivot pin 74 when the shutter member 19 is in its closed position, it is evident that the application of any force to the exterior of the shutter member 19 would tend to further move the linkage member 73 in a counter-clockwise direction which is locked against such movement and which thus locks the shutter member 19 in its closed position. To open the shutter member 19, the handle portion 75 is moved in a clockwise direction and the line between the pivot pins 78 and 79 passes over the center of the pivot pin 74 permitting movement of the bolt member 58 along the slot 80 to open the shutter member 19. The spring 64, as above described, retains the shutter member 19 in any of its adjusted open positions.

In the embodiments of the invention illustrated in Figs. 1 to 5, the ventilator opening is provided through a horizontal portion of the automobile body so that the shutter member opens upwardly; and in a modified embodiment, illustrated in Figs. 6 to 8, a structure is provided in which the ventilator opening in the vehicle is in one of the upwardly directed walls so that the closure for that opening opens forwardly.

Referring to Figs. 6 to 8, an automobile is generally indicated at 84, and is only partially shown but is preferably of the "cab-over-engine" type of automobile. The vehicle 84 has a downwardly extending forward wall 86 with a ventilating opening 88 therethrough. A shutter member 90 is mounted over the opening 88 and is adapted to be moved forwardly and away from the vehicle to permit the passage of air into the vehicle through the opening 88. A U-shaped bracket member 92 is suitably fixed to the inner face of the shutter member 90 and has curved end arms 94 which may be pivotally mounted by pivot pins 96 to the vehicle 84 interiorly thereof above the top edge of the opening 88. The shutter member 90 may thus be pivoted about the pivot pins 96 to open and close the opening 88.

A dashboard 98 is mounted rearwardly of the front wall 86 and has an elongated upwardly extending opening 99 therethrough. An inwardly extending plate member 101 is mounted on the inner face of the dashboard 98 and has a portion substantially parallel to and adjacent one side edge of the opening 99.

A shutter operating mechanism is provided which includes an L-shaped operating arm 102 pivotally mounted by a pivot pin 103 to the plate member 101 adjacent the dashboard. The member 102 has an elongated slot 104 therethrough which is adapted to slidably receive therein a pivot bolt 105. The pivot bolt 105 has fixed thereto a linkage member 106 which is thus pivotally and slidably mounted relative to the member 102 within the slot 104. Another linkage member 107 forms a continuation of the linkage member 106, and is slidably mounted thereto by means of a bolt 108 which is received through an elongated slot 109 in the member 107. The member 107 is prevented from rotating relative to the member 106 by a flange 110 formed on one edge of the member 106 adjacent the engaging portion of the member 107. The flange 110 also engages one edge of the member 107 so that the member 107 forms an aligned extension of the member 106. The member 107 is pivotally attached by pivot pin 112 to a bracket 114 secured to the inner face of the shutter member 90.

The linkage member 106 extends through the elongated opening 99 and is pivotally and slidably secured relative to the member 102 as explained above, so that upon pivotal movement of the member 102 about its pivot point 103, the linkage member 106 is actuated to open and close the shutter member 90. In order to limit the opening movement of the shutter member 90 and to provide for locking of the shutter member 90 when it is in its closed position, an elongated curved slot 116 is provided through the plate member 101. The slot 116 corresponds to the slots 56 and 80 in the embodiments described above, and receives therethrough the bolt member 105. The slot 116 is described as a portion of a circle with its center at 120; and the center 120 is at a point above the center line of the linkage members 106 and 107 when the shutter member 90 is in its closed position. This provides for locking the shutter member 90 in its closed position and prevents the opening of the shutter member by the application of a tool from the exterior of the vehicle. It is evident that if any attempt were made to open the shutter member 90 from the exterior of a vehicle that the linkage member 106 would be pulled forwardly of the vehicle. As the center 120 of the arc 116 is above the center line of the linkage member 106 when the shutter member is in its closed position, this tendency to move the linkage member 106 forwardly would cause the pin 105 to tend to move in a clockwise direction, as viewed in Fig. 6, and such movement would be prevented by the abutment of the pin 105 against the lower edge of the opening 116.

In order to hold the shutter member in any of its adjusted open positions means are provided in the embodiment illustrated in Figs. 6 and 7 similar to the corresponding means illustrated above in regard to the embodiments illustrated in Figs. 1 to 5. Washers 60 and 62 are adapted to resiliently and frictionally engage the opposite surfaces of the member 101 and are held in such frictional engagement by means of a coil spring 64 and adjustable nut 65.

By raising the downwardly extending handle on the member 102, it is evident that the linkage member 106 is forced forwardly as the bolt member 105 rides upwardly within the slot 116 thus opening the shutter member 90. The shutter member would be held in any of its open positions by the frictional engagement of the washers 60 and 62 with the plate member 101.

Formal changes may be made in the specific embodiment of the invention described without departing form the spirit and substance of the invention, the scope of which is commensurate with the appended claims.

What is claimed is:

1. In a vehicle having a ventilating opening therethrough, a shutter member movably mounted within said opening to open and close said opening, a first supporting member mounted within said vehicle, a second supporting member mounted within said vehicle, a first linkage member pivotally mounted on said first supporting member, a second linkage member pivotally mounted to said second supporting member, said second linkage member and said second supporting member forming cooperating members, a third linkage member pivotally mounted to said first and second linkage members, means operatively connecting one of said linkage members with said shutter member, the construction and arrangement of said linkage members being such that the line between the pivotal connections of the third linkage member with the first and second linkage members passes over the point of pivotal connection of the second linkage member with its supporting member when the shutter member is opened and closed to thereby lock the shutter member in its closed position, one of said cooperating members having a slot formed therein, means connected to the other of said cooperating members and extending through said slot to provide a sliding connection therebetween, and spring means associated with said last named means resiliently and frictionally holding said second linkage member in sliding engagement with said second supporting member to hold said shutter member in adjusted open positions.

2. In a vehicle having a ventilating opening therethrough, a shutter member movably mounted within said opening to open and close said opening, a first supporting member mounted within said vehicle, a second supporting member mounted within said vehicle, a first linkage member pivotally mounted on said first supporting member, a second linkage member pivotally mounted to said second supporting member, said second linkage member and said second supporting member forming cooperating members, a third linkage member pivotally mounted to said first and second linkage members, means operatively connecting one of said linkage members with said shutter member, the construction and arrangement of said linkage members being such that the line between the pivotal connections of the third linkage member with the first and second linkage members passes over the point of pivotal connection of the second linkage member with its supporting member when the shutter member is opened and closed to thereby lock the shutter member in its closed position, one of said cooperating members having an arcuate slot formed therein, said slot being formed on a radius about the point of pivotal connection between said second linkage member and said second supporting member, pin means connected to the other of said cooperating members and extending through said slot to provide a sliding connection therebetween, and spring means associated with said last named means resiliently and frictionally holding said second linkage member in sliding engagement with said second supporting member to hold said shutter member in adjusted open positions.

ALFRED PERSON.